United States Patent
Kao et al.

(10) Patent No.: US 9,134,844 B2
(45) Date of Patent: Sep. 15, 2015

(54) OPTICAL TOUCHPAD WITH POWER SAVING FUNCTIONS BASED ON DETECTED LIGHT

(75) Inventors: Ming-Tsan Kao, Hsin-Chu (TW); Chih-Yen Wu, Hsin-Chu (TW); Ren-Hau Gu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 261 days.

(21) Appl. No.: 13/290,122

(22) Filed: Nov. 6, 2011

(65) Prior Publication Data
US 2012/0262421 A1 Oct. 18, 2012

(30) Foreign Application Priority Data
Apr. 15, 2011 (TW) ............... 100113140 A

(51) Int. Cl.
*G06F 3/042* (2006.01)
*G06F 3/041* (2006.01)
*G06F 1/32* (2006.01)

(52) U.S. Cl.
CPC ............ *G06F 3/0416* (2013.01); *G06F 1/3231* (2013.01); *G06F 1/3265* (2013.01); *G06F 1/3287* (2013.01); *G06F 3/0421* (2013.01); *Y02B 60/1242* (2013.01); *Y02B 60/1282* (2013.01); *Y02B 60/1289* (2013.01)

(58) Field of Classification Search
CPC .................... G06F 3/0421; G06F 3/041–3/047
USPC ......................................................... 345/175
See application file for complete search history.

(56) References Cited

U.S. PATENT DOCUMENTS

| | | | |
|---|---|---|---|
| 2002/0110373 A1* | 8/2002 | Engle et al. ................... | 396/263 |
| 2004/0233153 A1* | 11/2004 | Robinson ...................... | 345/102 |
| 2008/0122792 A1* | 5/2008 | Izadi et al. .................... | 345/173 |
| 2008/0259053 A1* | 10/2008 | Newton ........................ | 345/175 |
| 2009/0058832 A1* | 3/2009 | Newton ........................ | 345/175 |
| 2009/0207194 A1* | 8/2009 | Wang et al. ................... | 345/690 |
| 2011/0007021 A1* | 1/2011 | Bernstein et al. ............. | 345/174 |
| 2011/0090163 A1* | 4/2011 | Lee ............................... | 345/173 |
| 2011/0248152 A1* | 10/2011 | Svajda et al. ................. | 250/221 |

FOREIGN PATENT DOCUMENTS

EP      1531453 A2 *  5/2005   ............... G09G 3/36

* cited by examiner

Primary Examiner — Jimmy H Nguyen
Assistant Examiner — Hang Lin
(74) *Attorney, Agent, or Firm* — Winston Hsu; Scott Margo

(57) ABSTRACT

Optical touchpad includes a light source for emitting light of a specific wavelength, a specific-light sensing array for sensing the specific light after being reflected by an instruction object for accordingly generating a specific-light sensing image, a proximity detector for determining an instruction distance between the instruction object and the optical touchpad according to the specific-light sensing image, and a motion detector for determining path of the instruction object and then outputting a motion signal according to the specific-light sensing image. When the instruction distance is greater than a predetermined value, the motion detector is turned off.

13 Claims, 3 Drawing Sheets

OPTICAL TOUCHPAD WITH POWER SAVING FUNCTIONS BASED ON DETECTED LIGHT

BACKGROUND OF THE INVENTION

1. Field of the Invention

The present invention relates to a touchpad, and particularly to an optical touchpad with power-saving functions.

2. Description of the Prior Art

Portable electronic devices, such as mobile phones, are already widely used by the public. Under intense market competition, all manufacturers are forced to come up with new features for the portable electronic device. However, portable electronic devices are ultimately powered by their battery, which means that standby time is limited by battery capacity. Thus, manufacturers are keenly interested in technologies that can lower power consumption in portable electronic devices with limited battery power.

The backlight module accounts for the highest power consumption in traditional portable electronic devices. Thus, effective reduction of power consumption in the backlight module can greatly extend standby time of the portable electronic device. For example, when the user has not used his/her mobile phone for a period of time, the backlight module automatically turns off. Or, when ambient light near the portable electronic device is intense, backlight module intensity is increased.

However, the portable electronic device must include extra circuitry to be able to detect environmental light intensity, which incurs even more power consumption. Thus, even if the extra circuitry is added to the portable electronic device to detect environmental light, the amount of power savings provided is limited, and cannot truly extend the standby time effectively, which is inconvenient for the user.

SUMMARY OF THE INVENTION

According to an embodiment, an optical touchpad comprises a light source, a specific-light sensing array, a proximity detector and a motion detector. The light source is for emitting a specific-light. The specific-light sensing array is for sensing reflected light of the specific-light reflected by an instruction object to generate a signal of a specific-light sensing image that indicates that the reflected light of the specific-light reflected by the instruction object is sufficient for the specific-light sensing array to sense the specific-light sensing image. The proximity detector is for determining an instruction distance between the instruction object and the optical touchpad according to the signal intensity of the specific-light sensing image, wherein the higher the signal intensity of the specific-light sensing image, the closer the instruction distance is, up to the instruction object contacting the optical touchpad. The motion detector is for determining a motion path of the instruction object according to motion of the signal of the specific-light sensing image over the specific-light sensing array for outputting an instruction object motion signal. When the signal intensity of the specific-light sensing image weakens to less than a predetermined value, the proximity detector determines that the instruction distance is too great, and the motion detector is turned off.

According to an embodiment, a portable electronic device comprises an optical touchpad, a display panel, and a processor. The optical touchpad includes a light source, a specific-light sensing array, a proximity detector, and a motion detector. The light source is for emitting a specific-light. The specific-light sensing array is for sensing reflected light of the specific-light reflected by an instruction object to generate a signal of a specific-light sensing image that indicates that the reflected light of the specific-light reflected by the instruction object is sufficient for the specific-light sensing array to sense the specific-light sensing image. The proximity detector is for determining an instruction distance between the instruction object and the optical touchpad according to the signal intensity of the specific-light sensing image, wherein the higher the signal intensity of the specific-light sensing image, the closer the instruction distance is, up to the instruction object contacting the optical touchpad. The motion detector is for determining a motion path of the instruction object according to motion of the signal of the specific-light sensing image over the specific-light sensing array for outputting an instruction object motion signal. When the signal intensity of the specific-light sensing image weakens to less than a predetermined value, the proximity detector determines that the instruction distance is too great, and the motion detector is turned off. The display panel is for displaying a target object. The processor is for moving position of the target object on the display panel according to the motion path outputted by the motion detector.

A method of operating a portable electronic device comprises detecting distance between a target object and the portable electronic device, and turning off a motion detector of the portable electronic device according to the detection result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
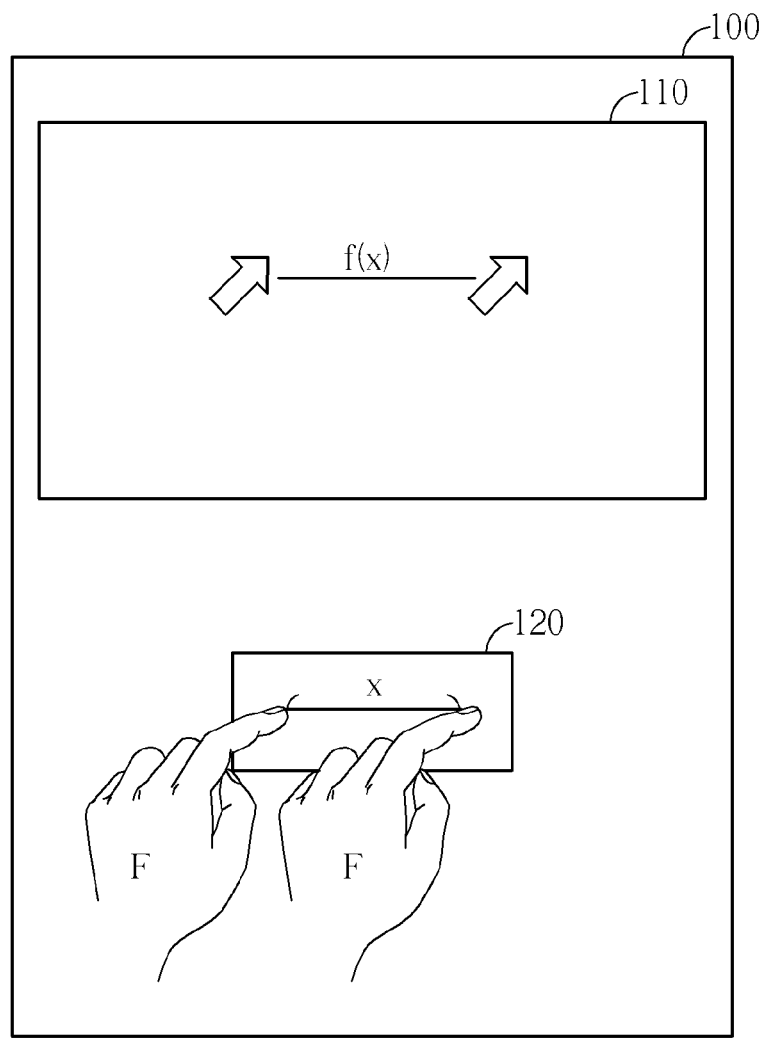
FIG. 1 is a diagram of a portable electronic device having power-saving functions according to an embodiment.

Please refer to FIG. 1, which is a diagram of portable electronic device 100 having power-saving functions according to an embodiment. FIG. 1 is intended to aid the reader in understanding use scenarios of portable electronic device 100, therefore certain elements, e.g. keyboard and speakers, which are peripheral to the embodiment, are omitted for simplicity. As shown, portable electronic device 100 comprises a display panel 110 and an optical touchpad 120. Display panel 110 displays a target object C, e.g. a cursor. When a user moves cursor C, the user may position instruction object F, e.g. his/her finger, over the optical touchpad 120 and make a motion. When optical touchpad 120 senses motion by user's finger F, cursor C moves along therewith. Additionally, portable electronic device 100 uses indirect touch, meaning that when finger F moves a distance X over optical touchpad 120, cursor C moves a distance f(X), where f(X) is a function of X, and is generally greater than X. This allows area of optical touchpad 120 to be smaller than that of display panel 110, which saves cost.

Figure 2:
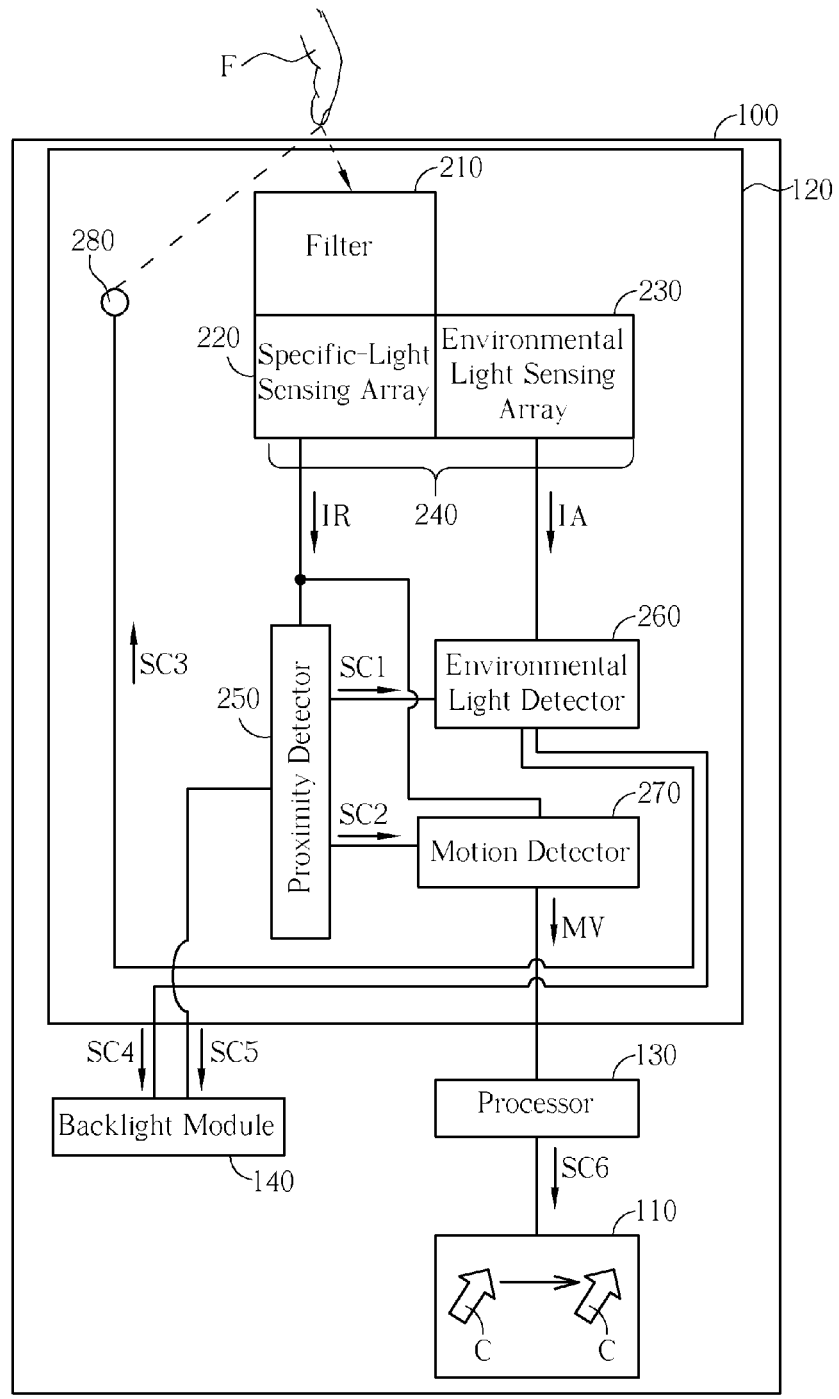
FIG. 2 is a diagram of an optical touchpad having power-saving functions according to an embodiment.

Please refer to FIG. 2, which is a diagram of an optical touchpad 120 having power-saving functions according to an embodiment. As shown in FIG. 2, optical touchpad 120 comprises a filter 210, a specific-light sensing array 220, an environmental light sensing array 230, a proximity detector 250, an environmental light detector 260, a motion detector 270 and a light source 280. Additionally, portable electronic device 100 further comprises a processor 130 and a backlight module 140. Specific-light sensing array 220 and environmental light sensing array 230 may form a sensor array 240. In other words, part of sensor array 240 covered by filter 210 becomes specific-light sensing array 220, and the remaining area is the environmental light sensing array 230.

Filter 210 is used for filtering a specific wavelength of light, e.g. visible wavelengths. Thus, light sensed by specific-light sensing array 220 is concentrate in wavelengths not filtered by filter 210, e.g. invisible light wavelengths, such as infrared. Light source 280 emits invisible light to pass through filter 210 and reach specific-light sensing array 220 according to this characteristic.

In this way, when the user moves cursor C on display panel 110, the user brings his/her finger F near optical touchpad 120, then moves his/her finger F to move cursor C. At this time, light emitted by light source 280 is reflected to sensor array 240. Because environmental light sensing array 230 is not equipped with a filter, environmental light sensing array 230 does not know whether light received is light emitted from light source 280 or merely a shift in environmental light. On the other hand, because specific-light sensing array 220 is equipped with filter 210, light received by specific-light sensing array 220 is determined to be light emitted from light source 280 and reflected by finger F.

Thus, using invisible light emitted by light source 280 allows finger F to form an image on specific-light sensing array 220 for generating sensing image IR, which has an image pattern of a fingerprint. Proximity detector 250 can determine distance between finger F and touchpad 120 according to sensing image IR for generating control signals SC1, SC2 based thereupon, so as to control turning on and shutting off of environmental light detector 260 and motion detector 270 individually.

More specifically, proximity detector 250 determines distance between finger F and touchpad 120 according to light intensity reflected by sensing image IR. When signal intensity of sensing image IR is lower than a predetermined value, i.e. distance between finger F and touchpad 120 is greater than an instruction distance, finger F may not be in the vicinity of touchpad 120. At this time, environmental light detection may be performed without performing motion detection. Thus, control signal SC1 turns on environmental light detector 260 to perform environmental light detection, and control signal SC2 turns off motion detector 270 to save power. On the other hand, when signal intensity of sensing image IR is higher than the predetermined value, i.e. distance between finger F and touchpad 120 is less than the instruction distance, finger F should be near touchpad 120. At this time, motion detection is needed, but environmental light detection need not be performed. Thus, control signal SC2 turns on motion detector 270 to perform motion detection, and control signal SC1 turns off environmental light detector 260 to save power.

Additionally, proximity detector 250 can generate control signal SC5 according to shape/intensity of sensing image IR to select whether or not to turn off backlight module 140. For example, when user is talking on the phone, the entire portable electronic device 100 is pressed up against the user's ear, so that touchpad 120 is completely covered by the ear. Thus, sensing image IR generated has different shape and intensity than finger F. At this time, backlight module 140 naturally does not need to be turned on, so proximity detector 250 can send out control signal SC5 to turn off backlight module 140.

Motion detector 270 is used for receiving sensing images IR generated by specific-light sensing array 220, and determining motion path of finger F, i.e. motion direction and distance, according to changes over a series of consecutive sensing images IR, whereby a motion vector MV, i.e. an instruction object motion signal, is generated.

Processor 130 receives motion vector MV, and enters motion vector MV into a predetermined algorithm to generate control signal SC6 to move cursor C on display panel 110. For example, when finger F moves left on touchpad 120 by a distance X, processor 130 controls cursor C to move left by a distance X, or 2X, depending on how the algorithm is designed.

Environmental light detector 260 is used for receiving sensing image IA generated by environmental light sensing array 230, and determining environmental light intensity/brightness near touchpad 120/portable electronic device 100 based thereupon, so as to generate control signals SC3, SC4 for individually controlling light source 280 and backlight module 140.

More specifically, increases in signal intensity of sensing image IA, which represent increases in environmental light intensity, indicate that the user does not need backlight module 140, and can clearly see content displayed on display panel 110. Thus, control signal SC4 lowers brightness of backlight module 140, or even turns backlight module 140 off, to save power. Alternatively, control signal SC4 increases backlight module 140 brightness. Additionally, environmental light is made up at least partially of invisible light. Thus, as environmental light is filtered by filter 210, some part of environmental light will enter specific-light sensing array 220, and influence accuracy of sensing image IR. Thus, as environmental light intensity increases, control signal SC3 increases light source 280 intensity to improve signal-to-noise ratio (SNR) of sensing image IR. Alternatively, control signal SC3 lowers light source 280 intensity to save power.

Figure 3:
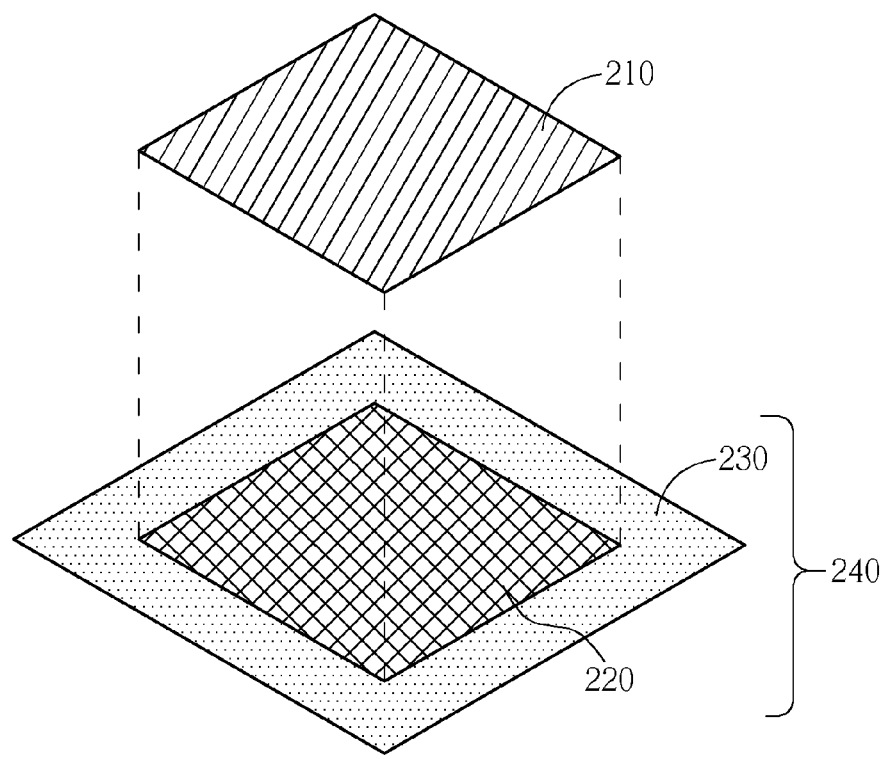
FIG. 3 is a diagram of specific-light sensing array, environmental light sensing array, and filter according to an embodiment.

Please refer to FIG. 3, which is a diagram of specific-light sensing array, environmental light sensing array, and filter according to an embodiment. As shown in FIG. 3, filter 210 may be centrally arranged over sensor array 240. Thus, the central region of sensor array 240 is covered by filter 210 to form specific-light sensing array 220. Peripheral regions of sensor array 240 are not covered by filter 210, and form environmental light sensing array 230. However, the structure shown in FIG. 3 is an example for illustrative purposes only. In practice, filter position may change while maintaining the same effectiveness.

The optical touchpad provided can use environmental light and user behavior to selectively turn on/off environmental light detector and/or motion detector to effectively save power. Portable electronic devices that employ the optical touchpad disclosed herein have increased flexibility to adjust/turn off backlight module to save power, and provide incredible convenience to the user.

Those skilled in the art will readily observe that numerous modifications and alterations of the device and method may be made while retaining the teachings of the invention.

What is claimed is:

1. An optical touchpad comprising:
    a light source for emitting a specific-light;
    a specific-light sensing array for sensing reflected light of the specific-light reflected by an instruction object to generate a signal of a specific-light sensing image that indicates that the reflected light of the specific-light reflected by the instruction object is sufficient for the specific-light sensing array to sense the specific-light sensing image;

a proximity detector for determining an instruction distance between the instruction object and the optical touchpad according to the signal intensity of the specific-light sensing image, wherein the higher the signal intensity of the specific-light sensing image, the closer the instruction distance is, up to the instruction object contacting the optical touchpad, and the proximity detector generates a control signal according to the signal intensity of the specific-light sensing image;

a motion detector independent from the proximity detector for determining a motion path of the instruction object according to motion of the signal of the specific-light sensing image over the specific-light sensing array for outputting an instruction object motion signal;

an environmental light sensing array for sensing light near the optical touchpad to output a signal of an environmental light sensing image; and an environmental light detector for adjusting intensity of the specific-light emitted by the light source according to the signal of the environmental light sensing image, wherein the signal of the environmental light sensing image represents intensity of light near the optical touchpad;

wherein when the signal intensity of the specific-light sensing image weakens to less than a predetermined value while still being strong enough for the specific-light sensing array to sense the reflected light of the specific-light reflected by the instruction object, the proximity detector determines that the instruction distance is too great, and the proximity detector issues the control signal to the motion detector to turn off the motion detector while keeping the proximity detector and the environmental light detector turned on, and when the motion detector is turned on, the environmental light detector is turned off.

2. The optical touchpad of claim 1, wherein when the signal intensity of the specific-light sensing image intensifies to greater than the predetermined value, the motion detector is turned on.

3. The optical touchpad of claim 1, wherein the environmental light sensing array and the specific-light sensing array are formed by a sensor array having a filter, the specific-light sensing array is a part of the sensor array covered by the filter, and the environmental light sensing array is a part of the sensor array not covered by the filter.

4. The optical touchpad of claim 1, wherein when intensity of light near the optical touchpad increases, intensity of the specific-light emitted by the light source increases.

5. The optical touchpad of claim 1, wherein when the signal intensity of the specific-light sensing image weakens to less than the predetermined value, the environmental light detector is turned on, and when the signal intensity of the specific-light sensing image intensifies to greater than the predetermined value, the environmental light detector is turned off.

6. A portable electronic device comprising:
an optical touchpad comprising:
a light source for emitting a specific-light;
a specific-light sensing array for sensing reflected light of the specific-light reflected by an instruction object to generate a signal of a specific-light sensing image for indicating that the reflected light of the specific-light reflected by the instruction object is sufficient for the specific-light sensing array to sense the specific-light sensing image;
a proximity detector for determining an instruction distance between the instruction object and the portable electronic device according to the signal intensity of the specific-light sensing image, wherein the higher the intensity of the signal, the closer the instruction distance is, up to the instruction object contacting the optical touchpad, and the proximity detector generates a control signal according to the signal intensity of the specific-light sensing image;

a motion detector independent from the proximity detector for determining a motion path of the instruction object according to motion of the signal of the specific-light sensing image on the specific-light sensing array for outputting an instruction object motion signal;

an environmental light sensing array for sensing light near the portable electronic device to output a signal of an environmental light sensing image; and an environmental light detector for adjusting intensity of the specific-light emitted by the light source according to the signal of the environmental light sensing image, wherein the signal of the environmental light sensing image represents intensity of light near the optical touchpad;

wherein when the signal intensity of the specific-light sensing image weakens to below a predetermined value while still being strong enough for the specific-light sensing array to sense the reflected light of the specific-light reflected by the instruction object, the proximity detector determines the instruction distance is too great, and the proximity detector issues the control signal to the motion detector to turn off the motion detector while keeping the proximity detector and the environmental light detector turned on, and when the motion detector is turned on, the environmental light detector is turned off;

a display panel for displaying a target object; and a processor for moving position of the target object on the display panel according to the motion path outputted by the motion detector.

7. The portable electronic device of claim 6, wherein when the signal intensity of the specific-light sensing image intensifies to greater than the predetermined value, the motion detector is turned on.

8. The portable electronic device of claim 6, the environmental light sensing array and the specific-light sensing array are formed by a sensor array having a filter, the specific-light sensing array is a part of the sensor array covered by the filter, and the environmental light sensing array is a part of the sensor array not covered by the filter.

9. The portable electronic device of claim 6, wherein when intensity of light near the portable electronic device increases, intensity of the specific-light emitted by the light source increases.

10. The portable electronic device of claim 6, wherein when the signal intensity of the specific-light sensing image weakens to less than the predetermined value, the environmental light detector is turned off, and when the signal intensity of the specific-light sensing image intensifies to greater than the predetermined value, the environmental light detector is turned on.

11. The portable electronic device of claim 6, further comprising a backlight module controlled by the environmental light detector and the proximity detector.

12. The portable electronic device of claim 11, wherein when the environmental light detector determines that the intensity of the light near the portable electronic device intensifies to greater than a predetermined intensity, the backlight module is turned off.

13. The portable electronic device of claim 11, wherein when the proximity detector determines that a target distance is less than a predetermined distance, the backlight module is turned off.

* * * * *